United States Patent
Nguyen et al.

(10) Patent No.: US 7,167,939 B2
(45) Date of Patent: Jan. 23, 2007

(54) ASYNCHRONOUS SYSTEM BUS ADAPTER FOR A COMPUTER SYSTEM HAVING A HIERARCHICAL BUS STRUCTURE

(75) Inventors: Hung T. Nguyen, Plano, TX (US); Keith D. Dang, Carrollton, TX (US)

(73) Assignee: LSI Logic Corporation, Milpitas, CA (US)

( * ) Notice: Subject to any disclaimer, the term of this patent is extended or adjusted under 35 U.S.C. 154(b) by 218 days.

(21) Appl. No.: 10/911,798

(22) Filed: Aug. 5, 2004

(65) Prior Publication Data

US 2006/0031619 A1  Feb. 9, 2006

(51) Int. Cl.
*G06F 13/368* (2006.01)
*G06F 3/00* (2006.01)
*G06F 13/14* (2006.01)
*G06F 11/00* (2006.01)

(52) U.S. Cl. .................. 710/120; 710/52; 710/305; 710/306; 710/113; 714/34

(58) Field of Classification Search .................. None
See application file for complete search history.

(56) References Cited

U.S. PATENT DOCUMENTS

| | | | | |
|---|---|---|---|---|
| 5,555,382 A | * | 9/1996 | Thaller et al. | 710/113 |
| 5,588,122 A | * | 12/1996 | Garcia | 710/52 |
| 5,675,751 A | * | 10/1997 | Baker et al. | 710/305 |
| 6,163,829 A | * | 12/2000 | Greim et al. | 710/260 |
| 6,687,773 B1 | * | 2/2004 | Stewart et al. | 710/65 |
| 6,754,759 B1 | * | 6/2004 | Cook et al. | 710/305 |
| 6,789,153 B1 | * | 9/2004 | Stewart | 710/306 |
| 6,892,266 B2 | * | 5/2005 | Reimer et al. | 710/305 |
| 6,948,098 B2 | * | 9/2005 | Pillay et al. | 714/34 |
| 7,020,733 B2 | * | 3/2006 | Kim et al. | 710/309 |
| 2003/0135678 A1 | * | 7/2003 | Andre | 710/243 |

* cited by examiner

*Primary Examiner*—Rehana Perveen
*Assistant Examiner*—Brian Misiura
(74) *Attorney, Agent, or Firm*—Suiter·Swantz PC LLO

(57) ABSTRACT

A computer system having a hierarchical bus structure that allows decoupling of a local bus from a global bus thereof. Decoupling of the local bus is achieved through use of an asynchronous system bus adapter which includes a local bus adapter for handling transactions, initiated by a system device coupled to the global bus, that require access to a local device coupled to the local bus and a global bus adapter for handling transactions, initiated by a local device coupled to the local bus, that require access to a system device coupled to the system bus. The local bus adapter is further configured to issue signals which prevent the global bus adapter from handling transactions initiated by local devices coupled to the local bus while transactions initiated by system devices coupled to the global bus are on-going.

21 Claims, 7 Drawing Sheets

US 7,167,939 B2

ASYNCHRONOUS SYSTEM BUS ADAPTER FOR A COMPUTER SYSTEM HAVING A HIERARCHICAL BUS STRUCTURE

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE DISCLOSURE

The present disclosure relates to the field of computer systems and, more specifically, to the field of bus management for computer systems having hierarchical bus structures.

BACKGROUND

Referring first to FIG. 1, a conventionally configured computer system 1 will now be described in greater detail. As may now be seen, the computer system 1 includes a digital signal processing (or "DSP") sub-system 2 and plural system devices 3-1 through 3-n, all of which are coupled to system bus 4. It should be clearly understood, however, that, as illustrated in FIG. 1, both the computer system 1 and the various components thereof have been greatly simplified for ease of description. For example, in addition to DSP core 2a, the DSP sub-system 2 will typically include a number of other components, for example, interface logic circuit, one or more memory devices for storing instructions and/or data, and one or more peripheral devices, omitted from FIG. 1 for ease of illustration. The DSP sub-system 2, as well as each one of the system devices 3-1 through 3-n are capable of accessing the system bus 4, for example, to perform a read operation from a peripheral memory device. Competing accesses to the system bus 4, for example, an access to the system bus 4 by the system device 3-1 and an access to the system bus 4 by the DSP sub-system 2, are handled by system arbiter 10.

As DSP applications became more complex, however, computer systems began requiring greater processing power than that available by employing the computer system 1. One solution to this demand for greater processing power may be seen in FIG. 2. As may now be seen, the computer system 1 has been modified by adding additional DSP sub-systems thereto. More specifically, FIG. 2 shows a multiple-DSP computer system 5 having a first DSP sub-system 7-1, a second DSP sub-systems 7-2 and plural system devices 8-1 through 8-n, all of which are coupled to the system bus 6. It should again be noted that both the computer system 5 and the various components thereof have been greatly simplified for ease of description. As before, each of the first and second DSP sub-system 7-1 and 7-2, as well as each one of the system devices 8-1 through 8-n are capable of accessing the system bus 6, for example, to perform a read operation from a peripheral memory device. Competing accesses to the system bus 6, for example, an access to the system bus 6 by the system device 8-1 and an access to the system bus 6 by the first DSP sub-system 7-1, are handled by system arbiter 9.

While the dual DSP sub-systems provides the computer system 5 with greater processing power when compared to the computer system 1, the solution shown in FIG. 2 is not without its drawbacks as well. More specifically, the bandwidth of the system bus 6 is now the limiting factor for the overall performance of the computer system 5. Bandwidth becomes of particular concern when the computer system 5 is an asynchronous system, for example, when the first and second DSP sub-systems 7-1 and 7-2 run at a first clock speed while the system devices 8-1 through 8-n run at a second, slower, clock speed. In such a system, the ability of the faster first and second DSP sub-systems 7-1 through 7-2 to complete transactions would be adversely affected by the slower system devices 8-1 through 8-n.

What is needed, therefore, is a multiple-DSP computer system configured to enable the DSP sub-systems thereof to function independently using only the resources of buses local to those DSP sub-systems. By doing so, traffic on a global bus of the multiple-DSP computer system would be reduced, thereby enhancing performance of the multiple DSP computer system.

SUMMARY

What is disclosed is a computer system having a hierarchical bus structure that allows a local bus of the computer system to be decoupled from a global bus of the computer system, thereby allowing the local bus to operate at a speed which may be different from the speed of the global bus. In accordance with an embodiment of the invention disclosed herein, decoupling of the local bus is achieved through use of an asynchronous system bus adapter which includes a local bus adapter for handling transactions, initiated by a system device coupled to the global bus, that require access to a local device coupled to the local bus and a global bus adapter for handling transactions, initiated by a local device coupled to the local bus, that require access to a system device coupled to the system bus. In one aspect of the embodiment of the invention disclosed herein, the local bus adapter is coupled to the global bus adapter for issuance, to the global bus adapter, of a signal which prevents the global bus adapter from handling transactions, initiated by local devices coupled to the local bus, that require access to system devices coupled to the global bus while transactions, initiated by system devices coupled to the global bus, that require access to the local devices coupled to the local bus are on-going.

In another aspect of the embodiment of the invention disclosed herein, the local bus adapter is comprised of a memory device, a first local interface device coupled between the global bus and the memory device and a second local interface device coupled between the memory device and the local bus. In further accordance with this aspect, the global bus adapter is comprised of a memory device, a first global interface device coupled between the local bus and the memory device and a second global interface device coupled between the memory device and the global bus. The first local interface device issues, to the second global interface device, signals which prevent the global interface device from transferring, from the memory device of the global bus adapter to the global bus, information related to transactions, initiated by a local device, that requires access to one of the system devices while transfers, from the global bus to the memory device of the local bus adapter, of information related to transactions, initiated by a system device, that requires access to one of the local devices, is on-going. Similarly, the second local interface device issues, to the first global interface device, signals which prevent the global interface device from transferring, from the local bus to the memory device of the global bus adapter, information related to transactions, initiated by a local device, that requires access to one of the system devices while transfers from the memory device of the local bus adapter to the local bus, of information, related to transactions initiated by a system device, that requires access to one of the local devices is on-going

DESCRIPTION OF THE DRAWINGS

For a more complete understanding of the present invention, reference is now made to the following detailed description, taken in conjunction with the accompanying drawings, in which like reference numerals identify similar elements, and in which.

NOTATION AND NOMENCLATURE

Various terms are used throughout the following description and claims to refer to particular system components. As one skilled in the art will appreciate, components may be referred to by different names. This document does not intend to distinguish between components that differ in name, but not in function.

Also, in the detailed description and claims which follow, the terms "including" and "comprising" are used in an open-ended fashion, and thus should be interpreted to mean "including, but not limited to . . . ".

The term "couple" or "couples" is intended to mean either an indirect or direct electrical, mechanical, thermal or communicative connection. Thus, if a first device is coupled to a second device, that connection may be through a direct connection or an indirect connection via other devices and/or connections.

The term "or" is used in an inclusive fashion and should be interpreted to mean "and/or."

The terms "associated with" and "associated therewith", as well as derivatives thereof, may mean "to include", "be included within", "interconnect with", "contain", "be contained within", "connect to", "connect with", "couple to", "couple with", "be communicable with", "cooperate with", "interleave", "juxtapose", "be proximate to", "be bound to", "be bound with", "have", "have a property of", or the like.

The term "controller" means any device, system or part thereof that controls at least one operation and is implemented in hardware, firmware, software, or a combination thereof. Functionality associated with any particular controller may be centralized or distributed, whether locally or remotely. Likewise, all functions set forth in the following detailed description and claims not specifically associated with any particular controller may be performed in hardware, software, firmware, or a combination thereof.

Definitions for certain other words and phrases may be provided throughout this patent document. Those of ordinary skill in the art should understand that in many, if not most instances, such definitions apply to prior, as well as future uses of such defined words and phrases.

DETAILED DESCRIPTION

Figure 1:
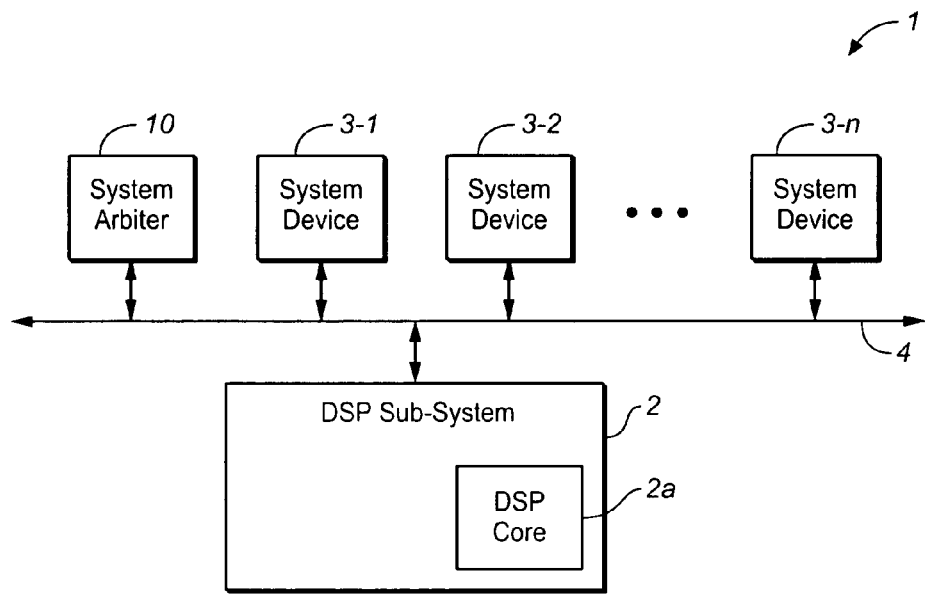
FIG. 1 is a block diagram of a first conventionally configured computer system characterized by a single DSP sub-system and plural system devices sharing a common system bus.
Figure 2:
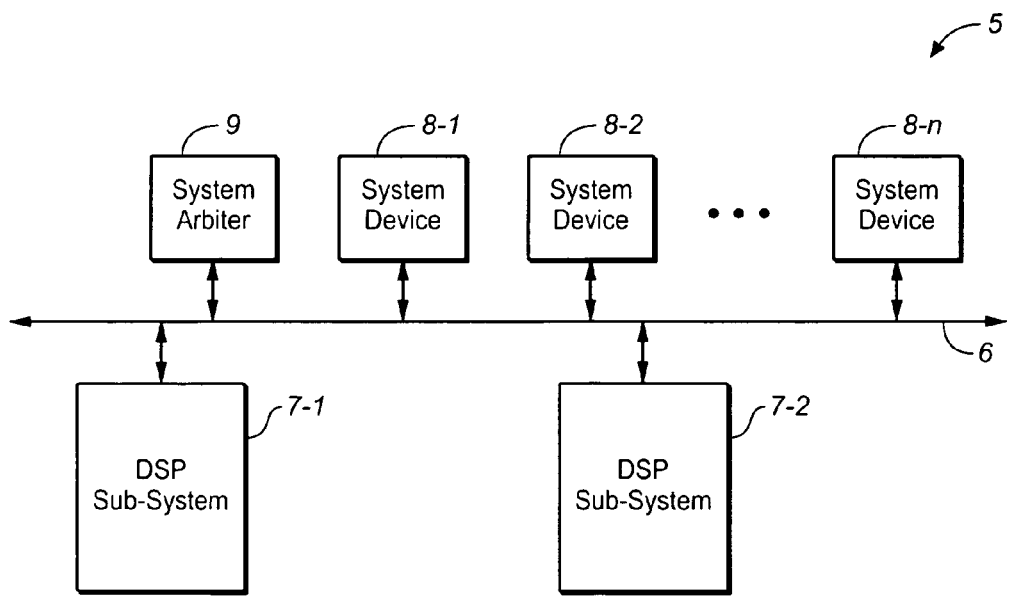
FIG. 2 is a block diagram of a second conventionally configured computer system characterized by dual DSP sub-systems and plural system devices sharing a common system bus.
Figure 3:
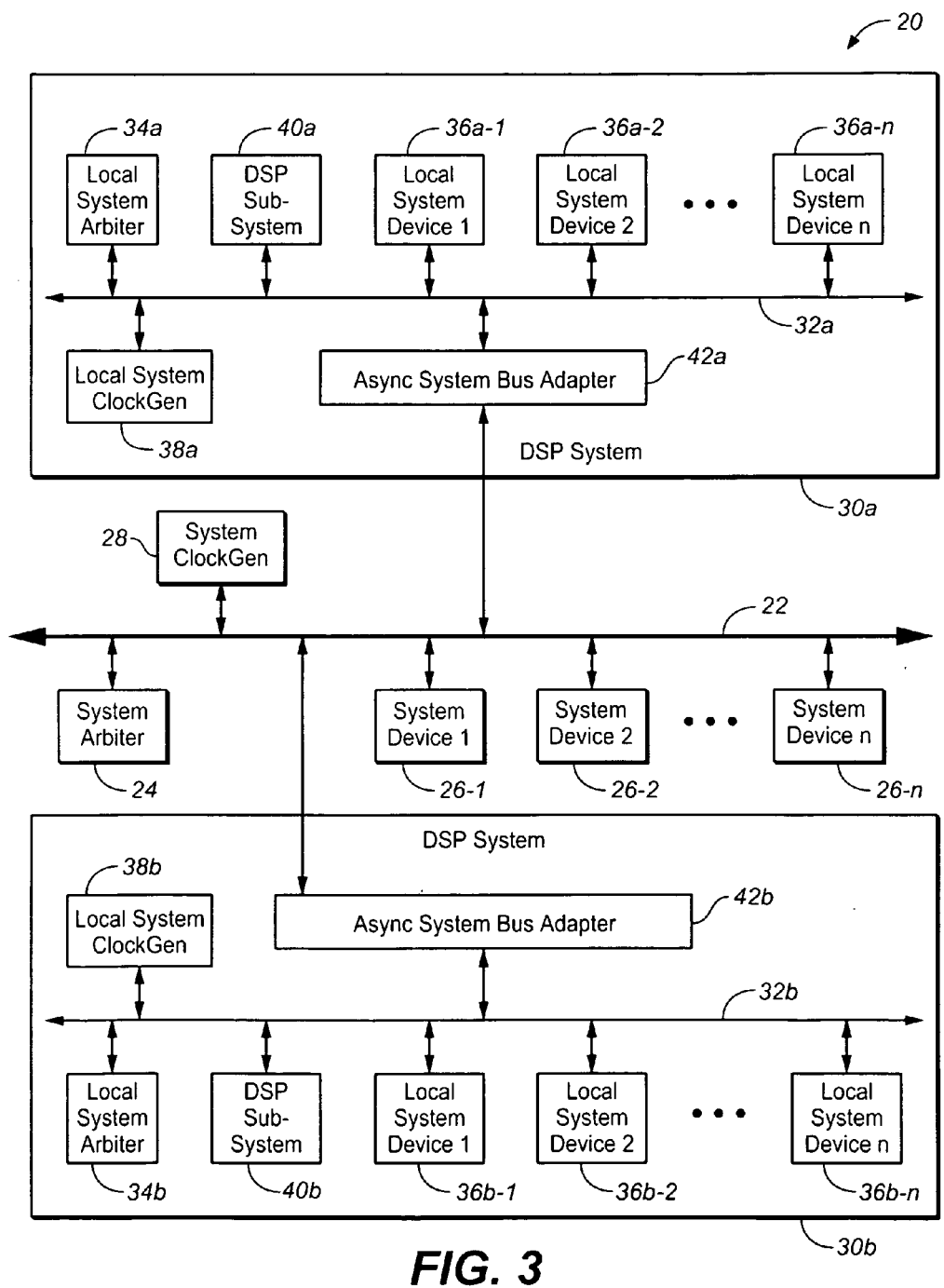
FIG. 3 is a block diagram of a computer system constructed in accordance with the teachings of the present invention and characterized by plural DSP systems, each equipped with an asynchronous system bus adapter which enables a local system bus of a first DSP system to be decoupled from a global system bus of the plural DSP computer system.

Referring now to FIG. 3, a block diagram of a computer system 20 constructed in accordance with the teachings of the present invention and characterized by plural DSP systems, each equipped with an asynchronous system bus adapter which enables a local system bus of the DSP system to be decoupled from a global system bus of the computer system 20, will now be described in greater detail. As may now be seen, the computer system 20 includes a global system bus 22 to which a system arbiter 24, a plurality of system devices 26-1 through 26-n, a global system clock generator 28, and first and second DSP systems 30a and 30b are coupled. Although only two DSP systems are shown in FIG. 3, it is fully contemplated that, if desired, any number of DSP systems may be coupled to the global system bus 22. The global system clock generator 28 generates the clock pulses and regulates the speed at which the global system bus 22 operates. The system arbiter 24 is responsible for determining and assigning priority among the various requests from the system devices 26-1 through 26-n and the DSP systems 30a and 30b that may require access to and/or use of the global system bus 22. It is contemplated that devices local to one or both of the first and second DSP systems 30a or 30b, or to any additional DSP systems forming part of the computer system 20, coupled to the global system bus 22 could operate at unique clock speeds different from the clock speed established by the global system clock generator 28.

As the operation of the first DSP system 30a is similar to the operation of the second DSP system 30b, for ease of description, hereafter, a generic reference to the DSP system 30 will be made. The DSP system 30 includes a local system bus 32, to which a local system arbiter 34, a plurality of local system devices 36-1 through 36-n, a local system clock generator 38, a DSP sub-system 40 and an asynchronous system bus adapter 42 are coupled. Similar to the function of the global system clock generator, the local system clock generator 38 generates the clock pulses and regulates the speed at which the local system bus 32 operates. The local system arbiter 34 is responsible for determining and assigning priority among the various requests from the local system devices 36, as well as the DSP sub-system 40, which require access and use of the local system bus 32. The DSP sub-system 40 could operate at a clock speed that is different from the clock speed established by the local system clock generator 38. Although only one DSP sub-system, specifically, the DSP sub-system 40, is shown in FIG. 3, it is fully contemplated that any number of DSP sub-systems may be coupled to the local system bus 32 and all of these additional DSP sub-systems can operate at unique clock speeds. Typically, the DSP sub-system 40 will include a number of other components, including, but not limited to, a DSP core, an interface logic circuit, one or more memory devices for storing instructions or data and one or more peripheral devices that have been omitted from FIG. 3 for ease of illustration. Finally, and as will be described in great detail below with respect to FIGS. 4–9, the asynchronous system bus adapter 42 couples the global system bus 22 to the local bus 32. Accordingly, the asynchronous system bus adapter 42 serves as the interface between the global system bus 22 and the local system bus 32. As a result, transactions issued by a local device, for example, the DSP sub-system 40, coupled to the local system bus 32, requiring access to a global device, for example, the system device 26-1, must be handled by the asynchronous system bus adapter 42. Similarly, transactions issued by a DSP sub-system coupled to a first local bus, for example, the DSP sub-system 40b coupled to the local system bus 32b, requiring access to a local device coupled to a second local bus, for example, the local system device 36a-1 coupled to the local system bus 32a must be handled by both the asynchronous system bus adapter 42b and the asynchronous system bus adapter 42a.

Figure 4:
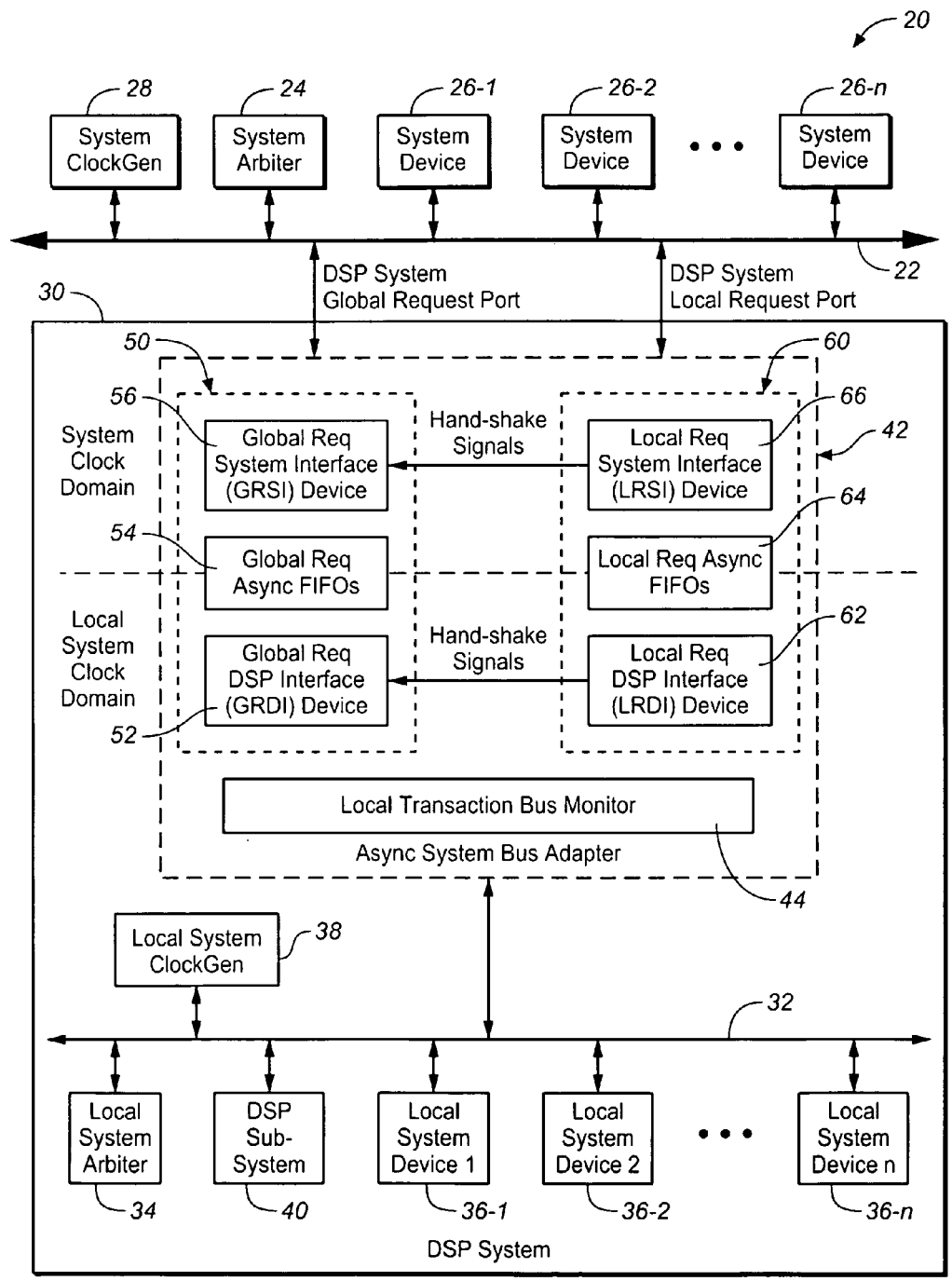
FIG. 4 is an expanded block diagram of an asynchronous system bus adapter of the first DSP system of the computer system of FIG. 3.

Referring now to FIG. 4, the asynchronous system bus adapter 42 will now be described in greater detail. As may now be seen more clearly, the asynchronous system bus adapter 42 provides an interface between the global system bus 22 of the computer system 20 and the local system bus 32 of the DSP system 30. The asynchronous system bus adapter 42 is comprised of a local transaction bus monitor 44, a global bus adapter 50, hereafter referred to as a global adaptive logic system (or "GALS"), and a local bus adapter 60, hereafter referred to as a local adaptive logic system (or "LALS"). The local transaction bus monitor 44 is responsible for determining if the target device of a request issued by a local system device coupled to the local system bus 32, for example, the local system device 36-1 or the DSP sub-system 40, is a local device (in which case, the request would stay on the local system bus 32) or a global device (in which case, the request would be directed onto the global system bus 22). If the target of the request is a local device, for example, if the DSP sub-system 40 is attempting to communicate with the local system device 36-1, the local transaction bus monitor 44 would recognize, from the address of the target device, that the request is a local request. The local transaction bus monitor 44 would then prevent the request originated by the DSP sub-system 40 from traveling out to the global system bus 22. Conversely, if the target device of the request generated by the DSP sub-system 40 is a global device coupled to the global system bus 22, for example, the system device 26-1, then the local transaction bus monitor 44 would allow the request to pass to the GALS 50.

The GALS 50 is responsible for handling global requests, originating with a device forming part of the DSP system 30, for example, the DSP sub-system 40, that require access to the global system bus 22. The GALS 50 includes a first global interface device 52, hereafter referred to as a global request DSP interface (GRDI) device, a global request asynchronous FIFO memory device 54 and a second global interface device 56, hereafter referred to as a global request system interface (GRSI) device. As will be more fully described below, the GRDI device 52 and the GRSI device 56 each include control logic for controlling operation of the global request asynchronous FIFO memory device 54. As will also be more fully described below, the global request asynchronous FIFO memory device 54 operates across two different clock domains, in the disclosed example, the domain of the local system clock generator 38 and the domain of the global system clock generator 28.

Figure 5A:
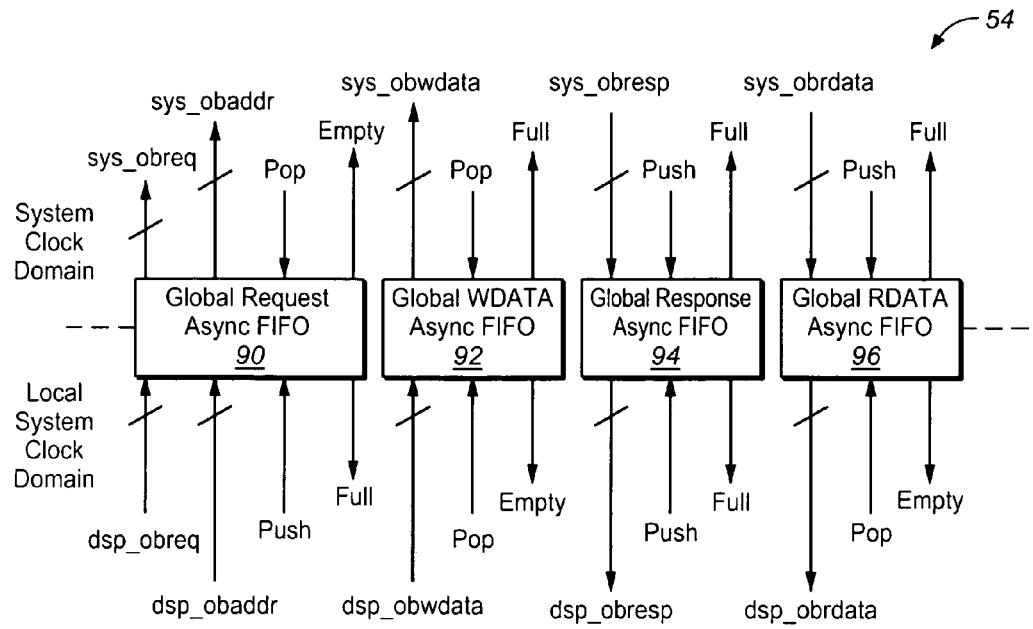
FIG. 5A is an expanded block diagram of plural first-in-first-out (or "FIFO") memory devices forming part of a global bus adapter of FIG. 4.

Referring next to FIG. 5A, the global request asynchronous FIFO memory device 54 will now be described in greater detail. As may now be seen, the global request asynchronous FIFO memory device 54 is comprised of plural FIFOs, more specifically, a global request asynchronous FIFO 90, a global write data asynchronous FIFO 92, a global response asynchronous FIFO 94 and a global read data asynchronous FIFO 96. New global transaction requests, generated by a local device, for example, the DSP sub-system 40, and addressed to a global device, for example, the system device 26-1, are queued in the global request asynchronous FIFO 90 before being placed on the global system bus 22. New global responses, generated by a local device in response to a local transaction request generated by a global device and addressed to the local device, are queued in the global response asynchronous FIFO 94 before being placed on the global system bus 22. Similarly, write transactions, generated by a local device and directed to a global device are queued in the global write data asynchronous FIFO 92 before being placed on the global system bus 22 while global reads, generated by local devices, are queued in the global read data asynchronous FIFO 96 before being placed on the global system bus 22.

Figure 5B:
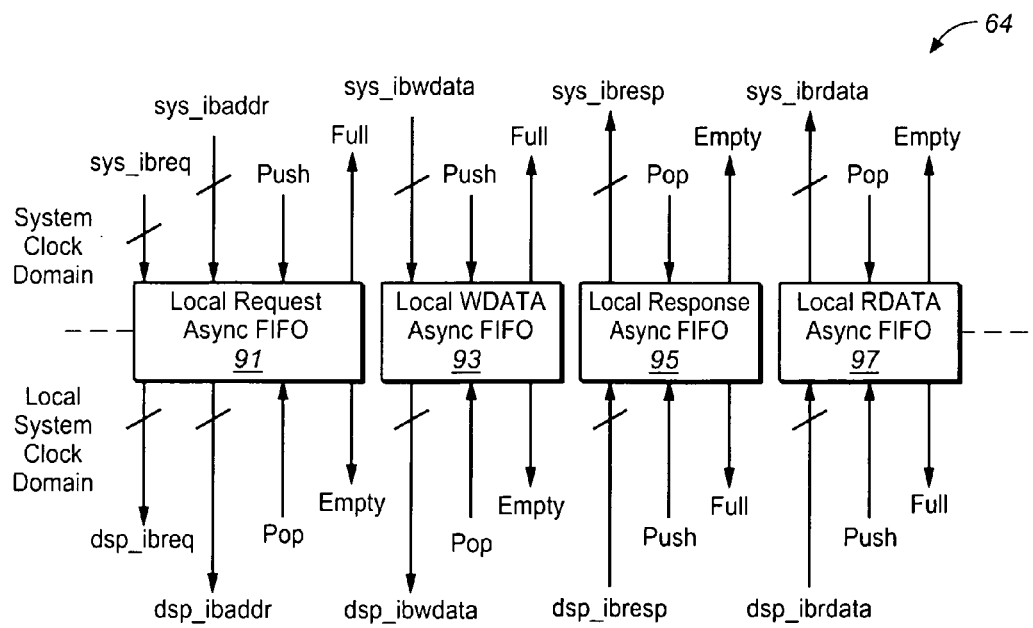
FIG. 5B is an expanded block diagram of plural FIFO memory devices forming part of a local bus adapter of FIG. 4.

Referring next to FIG. 5B, the local request asynchronous FIFO memory device 64 will now be described in greater detail. As may now be seen, the local request asynchronous FIFO memory device 64 is comprised of a local request asynchronous FIFO 91, a local write data asynchronous FIFO 93, a local response asynchronous FIFO 95 and a local read data asynchronous FIFO 97. New local transaction requests, generated by a global device, for example, the system device 26-1, and addressed to a local device, for example, the local system device 36-1, are queued in the local request asynchronous FIFO 91 before being placed on the local system bus 32. New local responses, generated by a global device in response to a global transaction request generated by a local device and addressed to the global device, are queued in the local response asynchronous FIFO 95 before being placed on the local system bus 32. Similarly, write transactions, generated by a global device and directed to a local device are queued in the local write data asynchronous FIFO 93 before being placed on the local system bus 32 while local reads, generated by global devices, are queued in the local read data asynchronous FIFO 97 before being placed on the local system bus 32

Figure 5C:
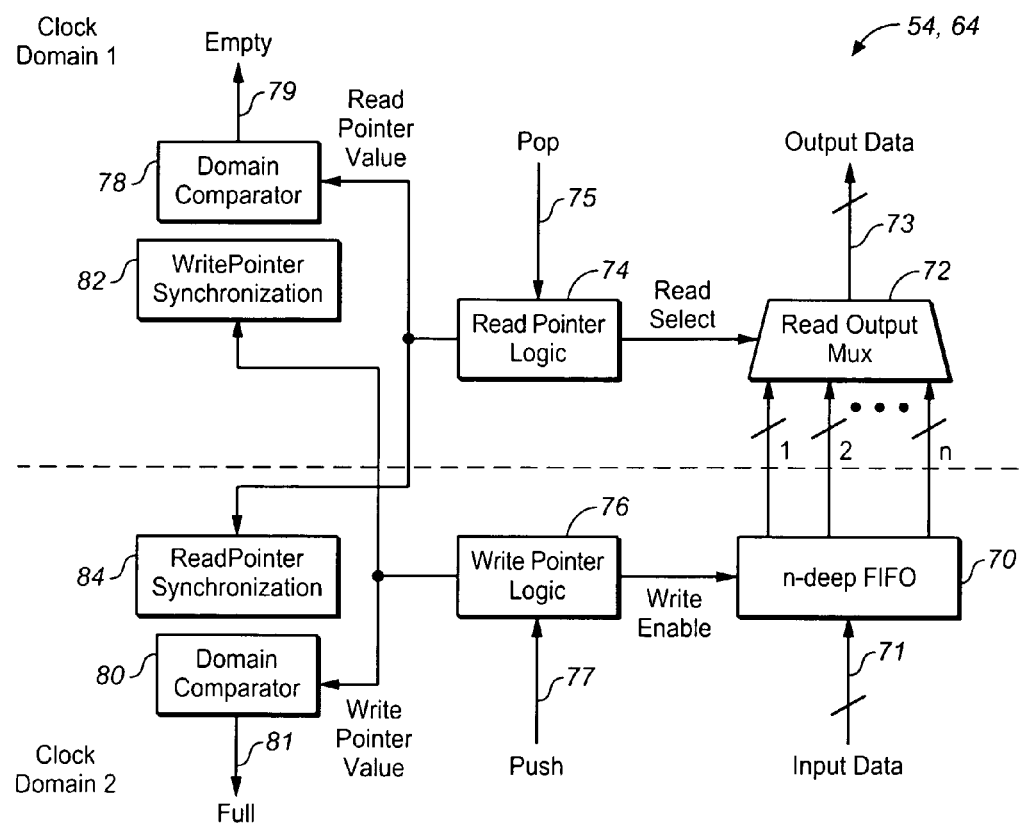
FIG. 5C is a schematic diagram of the FIFO memory devices of FIGS. 5A and 5B.

Referring next to FIG. 5C, both the global request asynchronous FIFO memory device 54 and the local request asynchronous FIFO memory device 64 will now be described in greater detail. As the global request asynchronous FIFO memory device 54 and the local request asynchronous FIFO memory device 64 are similarly configured, for ease of description, a generic reference to FIFO memory devices 54, 64 will hereafter be made. As may be seen in FIG. 5C, the FIFO memory device 54, 64 includes a data bank 70, for example, an n-deep FIFO capable of holding n locations of data in one clock domain, for receiving input data on input line 71; a read output multiplexer 72 for transmitting or otherwise propagating output data on output line 73; read pointer logic 74 which responds to a pop indicator signal on input line 75; write pointer logic 76 which responds to a push indicator signal on input line 77; a first domain comparator 78 that generates an empty indicator signal on output line 79; a second domain comparator 80 that generates a full indicator signal on output line 81; a write pointer synchronizer 82; and a read pointer synchronizer 84.

In order to handle a new request, for example, a request by a device, to enter information into the data bank 70 of the FIFO memory device 54, 64, the FIFO memory device 54, 64 will first check the status of the full indicator signal to determine if the data bank 70 is full. As will be more fully described below, the full indicator signal is generated by the second domain comparator 80 upon comparing the state or condition of the read pointer synchronization logic 84 to the state or condition of the write pointer synchronization logic 76. For the global request asynchronous FIFO memory device 54, either the GRDI device 52 or the GRSI device 56 may enter information into the data bank 70. Similarly, for the local request asynchronous FIFO memory device 64, either the LRSI device 66 or the LRDI device 62 may enter information into the data bank 70.

For the global request asynchronous FIFO memory device 54, when the state of the read pointer synchronization logic 84 is the same as the state of the write pointer logic 76, the second comparator 80 will use output line 81 to indicate, to whichever one of the GRDI device 52 or the GRSI device 56 is requesting to write data into the data bank 70, that the data bank 70 of the global request asynchronous FIFO memory device 54 is fill. On the other hand, if the state of the read pointer synchronization logic 84 is not the same as the state of the write pointer logic 76, then the second domain comparator 80 will use the output line 81 to indicate, to whichever of the GRDI device 52 or the GRSI device 56 is requesting to write data into the data bank 70, that the data bank 70 of the global request asynchronous FIFO memory device 54 is not full. If the signal transmitted on the output line 81 indicates that the global request asynchronous FIFO memory device 54 is not full and can receive new information, then whichever of the GRDI device 52 or the GRSI device 56 which received the indication on the output line 81, generates a push signal on input line 77 to the write pointer logic 76. In response, the write pointer logic 76 will enable a write to the data bank 70 and update the write pointer synchronization logic 82.

For the local request asynchronous FIFO memory device 64, when the state of the read pointer synchronization logic 84 is the same as the state of the write pointer logic 76, the second domain comparator 80 will use the output line 81 to indicate, to whichever of the LRSI device 66 or the LRDI device 62 is requesting to write data into the data bank 70, that the data bank 70 of the local request asynchronous FIFO memory device 64 is full. On the other hand, if the state of the read pointer synchronization logic 84 is not the same as the state of the write pointer logic 76, then the second domain comparator 80 will use the output line 81 to indicate, to whichever of the LRSI device 66 or the LRDI device 62 is requesting to write data into the data bank 70, that the data bank 70 of the local request asynchronous FIFO memory device 64 is not full. If the signal transmitted on the output line 81 indicates that the local request asynchronous FIFO memory device 64 is not full and can receive new information, then whichever of the LRSI device 66 or the LRDI device 62 which received the indicator on the output line 81, generates a push signal on input line 77 to the write pointer logic 76. In response, the write pointer logic 76 will enable a write to the data bank 70 and update the write pointer synchronization logic 82.

The write pointer synchronization logic 82 and the write pointer logic 76 are located in the clock domain of the global system clock generator 28 and the local system clock generator 38, respectively. The write pointer synchronization logic 82 is synchronized to the write pointer logic 76. The first domain comparator 78 compares the condition of the write pointer synchronization logic 82 and the read pointer logic 74 to determine if there is data in the data bank 70 that requires output onto its destination bus. If the first domain comparator 78 determines that the state of the write pointer synchronization logic 82 is not the same as the state of the read pointer logic 74, the first domain comparator 78 determines that the data bank 70 is not empty. For the global request asynchronous FIFO memory device 54, the first domain comparator 78 will then use the output line 79 to indicate to either the GRDI device 52 or the GRSI device 56 that the data bank 70 of the global request asynchronous FIFO memory device 54 is not empty. On the other hand, if the state of the write pointer synchronization logic 82 is the same as the state of the read pointer logic 74, then there is no data to be output from the data bank 70 and the first domain comparator 78 will use the output line 79 to indicate to either the GRDI device 52 or the GRSI device 56 that the data bank 70 of the global request asynchronous FIFO memory device 54 is empty.

Similarly, for the local request asynchronous FIFO memory device 64, if the first domain comparator 78 determines that the state of the write pointer synchronization logic 82 is not the same as the state of the read pointer logic 74, the first domain comparator 78 will use the output line 79 to indicate to either the LRSI device 66 or the LRDI device 62 that the data bank 70 of the local request asynchronous FIFO memory device 64 is not empty. On the other hand, if the state of the write pointer synchronization logic 82 is the same as the state of the read pointer logic 74, then there is no data to be outputted from the data bank 70 and the comparator 78 will use the empty indicator signal 79 to indicate to either the LRSI device 66 or the LRDI device 62 that the data bank 70 of the local request asynchronous FIFO memory device 64 is empty.

Continuing to refer to FIG. 5C, consider, for the global request asynchronous FIFO memory device 54, the condition where the state of the write pointer synchronization logic 82 is not the same as the state of the read pointer logic 74, thus indicating that there is data in the data bank 70. In this condition, the first domain comparator 78 generates a signal on the output line 79 which indicates, to the GRDI device 52 or the GRSI device 56, that there is data in the data bank 70. In return, the GRDI device 52 or the GRSI device 56 sends, on the input line 75, a pop signal to the read pointer logic 74. In response, the read pointer logic 74 signals the multiplexer 72 to send data on output line 73. The multiplexer 72, which is operating in a clock domain different from the clock domain of the data bank 70, is used for outputting the data in accordance with the clock domain of the multiplexer 72. The multiplexer 72 is synchronized to the clock pulse and follows the clock cycle output from the first domain comparator 78. Thus, the read pointer logic 74 and the write pointer logic 76 are synchronized across the two different clock domains.

Returning momentarily to FIG. 4, the LALS 60 is responsible for handling local requests or transactions, originating with a system coupled to the global system bus 22, for example, the system device 26-1, that require access to the local system bus 32, for example, if the request or transaction needs to be handled by the local system device 36-1. As may now be seen, the LALS 60 includes a first local interface device 66, hereafter referred to as a local request system interface (LRSI) device, a local request asynchronous FIFO memory device 64 and a second local interface device 62, hereafter referred to as a local request DSP interface (LRDI) device 62. As will be more fully described below, the LRSI device 66 and the LRDI device 62 each include control logic for controlling operation of the local request asynchronous FIFO memory device 64. Further, as previously set forth with respect to FIGS. 5B–C, the local request asynchronous FIFO memory device 64 operates across two clock domains—the domain of the local system clock generator 38 and the domain of the global system clock generator 28.

While the LALS 60 handles requests or transactions on the global system bus 22 that require access to the local system bus 32 and the GALS 50 handles requests or transactions on the local system bus 32 that require access to the global system bus 22, the two function similarly in many respects. As a result, many of the details previously set forth describing the operation of the GALS 50 are equally applicable to an understanding of the operation of the LALS 60. The two are distinct, however, in that the LALS 60 is coupled to the GALS 50 in a manner which prevents deadlocks between the requests being handled by the LALS 60 and those being handled by the GALS 50. The coupling between the LALS 60 and the GALS 50 also enables prioritization among multiple requests requiring access to the various system buses. More specifically, the LRSI device 66 is coupled to the GRSI device 56 in a manner which enables the LRSI device 66 to issue a handshake signal to the GRSI device 56 advising the GRSI device 56 of a local transaction between the global system bus 22 and the asynchronous bus adapter 42 which takes priority over a global transaction between the asynchronous bus adapter 42 and the global system bus 22 while the LRDI device 62 is coupled to the GRDI device 52 in a manner which enables the LRDI device 62 to issue a handshake signal to the GRDI device 52 advising the GRDI device 52 of a local transaction between the asynchronous bus adapter 42 and the local system bus 32 which takes priority over a global transaction between the local system bus 32 and the asynchronous bus adapter 42.

Figure 6:
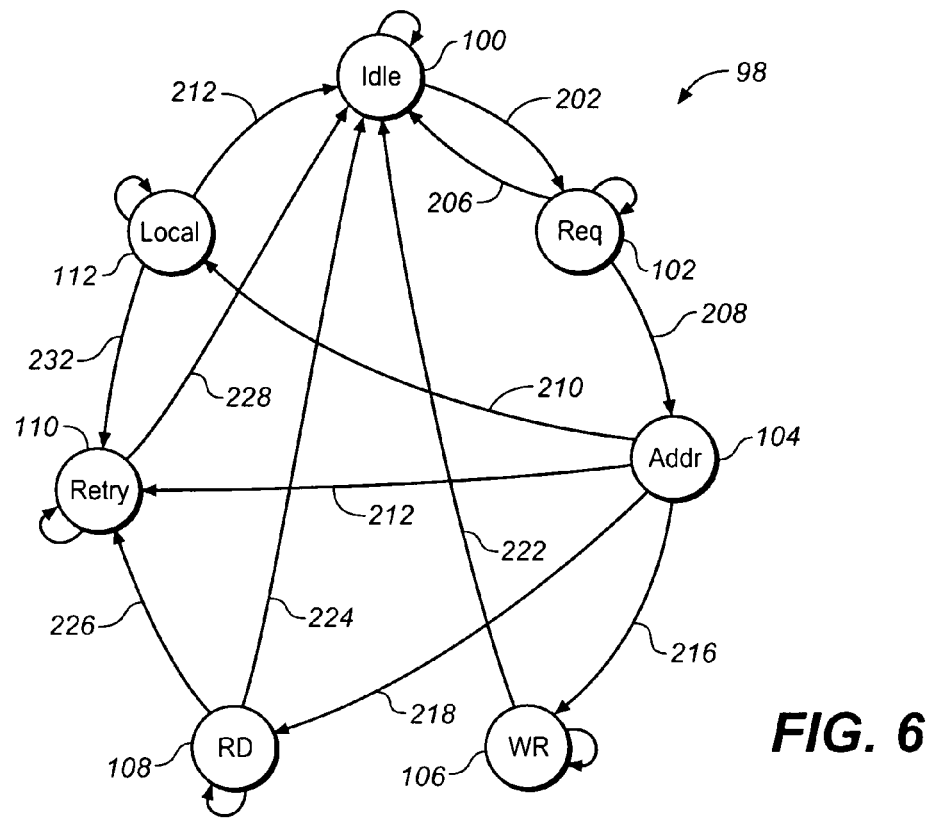
FIG. 6 is a state diagram for a state machine forming part of a first global interface device of the global bus adapter of FIG. 4.

Referring next to FIG. 6, a state diagram 98 suitable for use in implementing the control logic residing within the GRDI device 52 of the GALS 50 will now be described in greater detail. As previously set forth, the GALS 50 is utilized for global requests or transactions in which a local device, for example, the DSP sub-system 40, coupled to the local system bus 32 makes a request or initiates a transaction intended for a device that is coupled to the global system bus 22, for example, the system device 26. As part of such a global request or transaction, information related to the request or transaction must first be transferred from the local system bus 32 to the global request asynchronous FIFO memory device 54.

As shown in FIG. 6, the control logic for the GRDI device 52 supports a local bus protocol having separate request, grant, address and read/write cycles. More specifically, the state diagram 98 describing an implementation of the control logic for the GRDI device 52 has seven states: an idle state 100, a request state 102, an address state 104, a write state 106, a read state 108, a retry state 110, and a local state 112. The GRDI device 52 remains in the idle state 100 until a local device requestor, for example, the DSP sub-system 40, generates a new request. The GRDI device 52 will then transition, along path 202, to the request state 102. The GRDI device 52 will remain in the request state 102 until the DSP sub-system 40 receives a grant from the local arbiter 34 for access to the local bus 32. If the local bus 32 is available, then the DSP sub-system 40 is granted access to the local bus 32. The GRDI device 52 then transitions, via the path 208, to the address state 104. If, however, the DSP sub-system 40 is not granted access to the local bus 32 because a handshake signal has been received from the LRDI 62, thereby indicating the existence of a local request with a higher priority, the GRDI device 52 returns to the idle state 100 via the path 206.

Upon entering the address state 104, the GRDI device 52 waits while the local transaction bus monitor 44 determines if the request or transaction generated by the DSP sub-system 40 requires access to the local system bus 32. To do so, the local transaction bus monitor 44 checks the address of the destination of the request or transaction to determine if it is an address requiring access to the local system bus 32 or an address requiring access to the global system bus 22. If a check of the address reveals that the request or transaction requires access to the local system bus 32, the GRDI device 52 will transition to the local state 112 via the path 210. If, however, the transaction is a global transaction and the DSP sub-system 40 requires access to the global system bus 22 but has been unable to access the global system bus 22 because of the presence of a handshake signal from the LRDI device 62, the GRDI device 52 transitions to the retry state 110 via the path 212. Finally, if, at the address state 104, it is determined that the address of the transaction is a global address and there is no handshake signal from the LRDI device 62, the GRDI device 52 will instead transition to either to the write state 106 along the path 216 or to the read state 108 along the path 218.

If the transition is to the write state 106, then the request is pushed to the global request asynchronous FIFO memory device 54, as detailed above. If there is space in the global request asynchronous FIFO memory device 54, then the data is pushed into the global request asynchronous FIFO memory device 54 and the system returns to the idle state 100 via path 222. If, however, there is no space in the global request asynchronous FIFO memory device 54, then the GRDI device 52 will wait in the write state 106 until there is space available in the global request asynchronous FIFO memory device 54.

Returning to the address state 104, if it is instead determined that the transaction is a read transaction, then the GRDI device 52 transitions, along path 218, to the read state 108 for execution of the read transaction. If, upon entering the read state 108, a handshake signal is received from the LRDI device 62, again indicative of the existence of a request with a higher priority, the GRDI device 52 does not execute the read transaction and instead transitions to the retry state 110 via path 226 and then on to the idle state 100 via path 228. If, however, the GRDI device 52 does not receive an indication of a higher priority request from the LRDI device 62, the GRDI device 52 will stay, at the read state 108, until the read transaction is complete. Upon completion of the read transaction, for example, upon receipt of a valid read response, the GRDI device 52 returns to the idle state 100 along path 224.

Again returning to the address state 104, if it is instead determined that the transaction is intended for a system that is coupled to the local system bus 32, for example, the local system device 36-1, it is determined that the request does not require access to the global system bus 22. Accordingly, the GRDI device 52 will transition to the local state 112 via path 210. The GRDI device 52 will then remain in the local state 112 until the transaction is complete and, once the transaction is complete, the GRDI device 52 will return to the idle state 100 along the path 212. If, however, the GRDI device 52 receives, from the LRDI device 62, a handshake signal indicating a competing request, specifically, that a global device coupled to the global system bus 22 also requires access to the local system bus 32, then the request from the global device is given priority and the GRDI device 52 will, after transitioning to the local state 112, subsequently transition to the retry state 110 along path 232.

Upon entering the retry state 110, the GRDI device 52 will stay in the retry state 110 for a predetermined period. Alternately, the predetermined period may be based upon either a count of clock cycles elapsed since entering the retry state 110 or a determination of the time period elapsed since entering the retry state 110. If the predetermined period expires and access to the local system bus 32 has not yet been granted to the local system device, the GRDI device 52 will transition to the idle state 100 via path 228.

Returning to the local state 112, the GRDI device 52 will stay in the local state 112 and a local device that has been granted control or access to the local system bus 32 by the local arbiter 34 can send requests to local devices until there are no more transactions or until the current device that required access to the local system bus 32 no longer has control of or owns the local system bus 32. At that point, the GRDI device 52 would return to the idle state 100 along the path 212. Of course, while the GRDI device 52 is in the local state 112, a device that owns or control the local system bus 32 for local use can be interrupted by the LRDI device 62 because there is a request for access to the local system bus 32 that has higher priority than the current device using the local system bus 32. Specifically, if a global device requests access to the local system bus 32, the LRDI device 62 would send a handshake signal to the GRDI device 52 and, in response thereto, the GRDI device 52 would transition to the retry state 110.

Returning one last time to the address state 104, if the bus monitor 44 determines that the transaction is a global transaction, then the local device must gain access to the global system bus 22. However, if the global system bus 22 is not available or the read/write transaction can not be performed, then the process will instead transition to the retry state 110 along path 212. There, the GRDI device 52 will continues to retry the transaction until the incoming global transaction is handled. As before, if the predetermined period expires while the GRDI device 52 is in the retry state 110 and transaction has not yet been complete, then the GRDI device 52 transitions to the idle state 100 along the path 228 and the device initiating the transaction will be instructed to resend the transaction.

Figure 7:
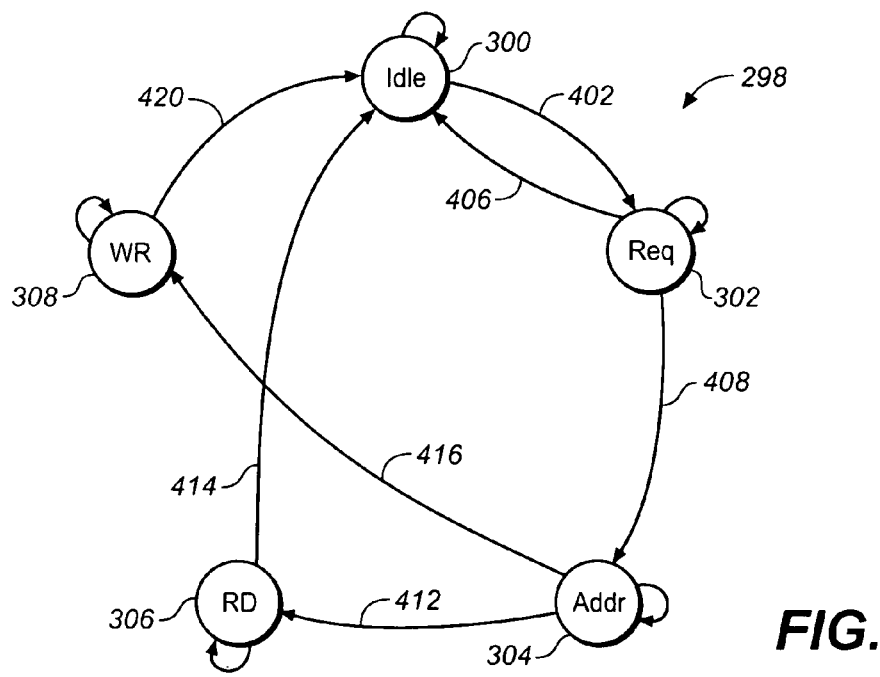
FIG. 7 is a state diagram for a state machine forming part of a second global interface device of the global bus adapter of FIG. 4.

Referring next to FIG. 7, a state diagram 298 suitable for use in implementing the control logic residing within the GRSI device 56 of the GALS 50 will now be described in greater detail. As may now be seen, the state diagram 298 describes an implementation of the control logic for the GRDI device 52 which has five states: idle state 300, request state 302, address state 304, read state 306 and write state 308. In a manner similar to the discussion set forth above with respect to the GRDI device 52, above, the GRSI device 56 will initially wait in the idle state 300. Also in a manner similar to the discussion set forth above with respect to the LRDI device 62, the LRSI device 66 uses a handshake signal to advise the GRSI device 56 that there is a higher priority request, specifically, a request from a global device requesting access to the local system bus 32.

If the GRSI device 56 receives a handshake signal from the LRSI device 66 and the local device which initiated the transaction being handled by the GRSI device 56 has not been given access to the global system bus 22 by the arbiter 24, then the global device that is making the request will be given priority over the local device. Thus, if the transaction being performed by the local device is a write transaction, then the transaction request remains in the global request asynchronous FIFO memory device 54. On the other hand, if the transaction is a read request transaction, then the read request transaction is removed from the global request asynchronous FIFO memory device 54 and will have to be retried again later.

If there is no request from a global device that has resulted in the LRSI device 66 issuing a handshake signal to the GRSI device 56, then the GRSI device 56 transitions to the request state 302 along path 402 to await a grant signal from the arbiter 24. From the request state 302, if the global system bus 22 is not available or if the request or read transaction is to be aborted or otherwise postponed, then the GRSI device 56 returns to the idle state 300 along the path 406. For example, a read transaction can be aborted or a write transaction can be delayed due to a request from a global device that is coupled to the global system bus 22. When a read request transaction is aborted, the request is removed from the global request asynchronous FIFO memory device 54 in the manner previously set forth.

When the local device that is making the request receives a grant to use the global system bus 22 from the arbiter 24, then the GRSI device 56 transitions to the address state 304 along path 408. At the address state 304, the GRSI device 56 waits for the request to be accepted by the target device or system coupled to the global system bus 22. If the local device has been granted access to the global system bus 22 and the request or transaction is a read, the GRSI device 56 transitions, along path 412, to the read state 306 if the transaction is a read transaction. The GRSI device 56 will then wait in the read state 306 for the data to be received and the read transaction to be completed. Read data and device status response are pushed into the global response asynchronous FIFO 94 and the global read data asynchronous FIFO 96, respectively. The request or transaction is popped from the global request asynchronous FIFO 90 and the GRSI device 56 returns to the idle state 300 along path 414.

Returning to the address state 304, if the local device has been granted access to the global system bus 22 and the request or transaction is a write, then the GRSI device 56 will instead move to the write state 308 along path 416. If the target device is ready to accept data, the GRSI device 56 will stay in the write state 308 until the transaction is complete. If the target global device accepts the write date, the write request is popped off the global request asynchronous FIFO 90 and the GRSI device 56 returns to the idle state 300. If, however, the target global device can not accept the write or the target global device is busy, then the GRDI device 56 transitions to the idle state 300 along path 420 to initiate a retry of the request or transaction.

As previously set forth, a request issued by a system or device coupled to the global system bus 22 for access to the local system bus 32 is handled by the LALS 60. The LALS 60 includes the LRSI device 66 and the LRDI device 62, each of which is configured to generate a handshake signal to the GRSI 66 and GRDI 62, respectively, in order to interrupt the control of the local system bus 32 by a local device, such as the device 36 or the DSP core sub-system 40, to allow a global device, for example, the system device 26-1, access to the local system bus 32.

Figure 8:
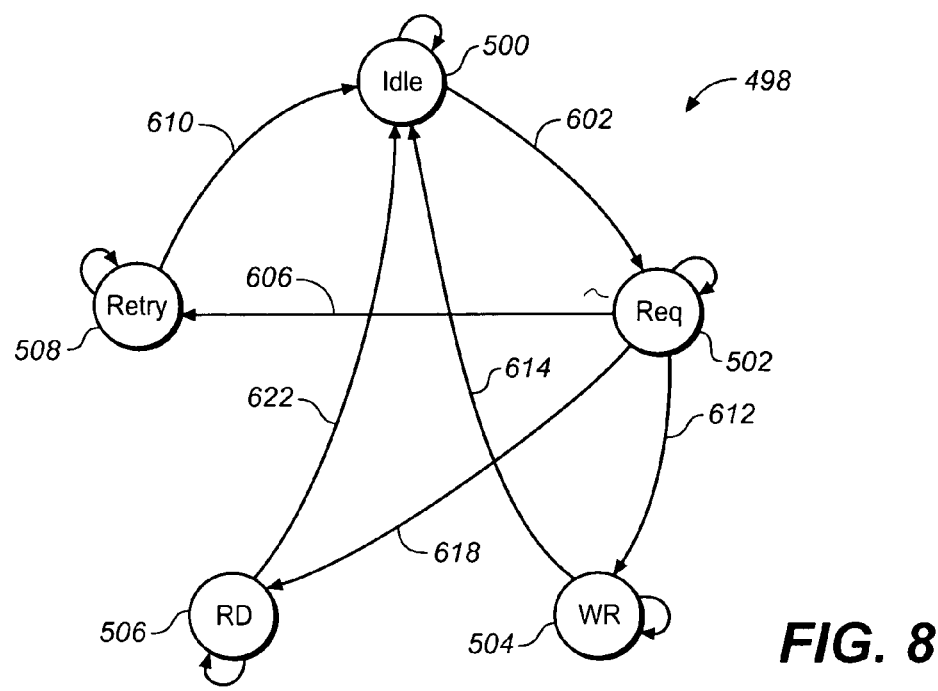
FIG. 8 is a state diagram for a state machine forming part of a first local interface device of the local bus adapter of FIG. 4.

Referring now to FIG. 8, a state diagram 498 suitable for use in implementing the control logic residing within the LRSI device 66 of the LALS 60 will now be described in greater detail. As may now be seen, the state diagram 498 describes an implementation of the control logic for the LRSI device 66 which has five states: an idle state 500, a request state 502, a write state 504, a read state 506, and a retry state 508. Initially, the LRSI device 66 is in the idle state 500 awaiting a request or transaction, from a global device, for example, the system device 26-1, coupled to the global system bus 22, for access to a device coupled to the local system bus 32. The LRSI device 66 will stay in the idle state 500 until it receives a request requiring access to the local system bus 32 from a global device that has control or access to the global system bus 22. Upon receiving such a request, the LRSI device 66 will transition to the request state 502 along path 602. Upon entering the request state 502, the LRSI device 66 transmits a handshake signal to the GRSI device 56. As previously set forth, if there is a local device that has control of or access to the local system bus 32, then the handshake signal causes the GRSI device 56 to interrupt that transaction, thereby allowing the global request to be processed before the request from the local device which previously had control of the local system bus 32 is processed.

Having interrupted any ongoing request from a local device, if the previous transactions have not been completed or if the local request asynchronous FIFO memory device 64 is full, the LRSI device 66 will transition from the request state 502 to the retry state 508 along path 606. The LRSI device 66 will stay at the retry state 508 until completion of the previous transaction or until expiration of a pre-selected period, for example, a predetermined number of clock cycles or a predetermined period of time. Upon completion of the previous transaction or upon expiration of the pre-selected time period, the LRSI device 66 transitions to the idle state 500 via path 610.

Returning to the request state 502, if the request or transaction is a write, the LRSI device 66 transitions to the write state 504 along path 612. In the write state 504, the LRSI device 66 pushes data into the local request asynchronous FIFO memory device 64 and, having completed the write, the LRSI device 66 transitions into the idle state 500 along path 614. If the local request asynchronous FIFO memory device 64 is full, however, the LRSI device 66 will wait in the write state 504 for the local request asynchronous FIFO memory device 64 to become available and, upon the local request asynchronous FIFO memory device becoming available, the LRSI device 66 will proceed in the manner previously described.

Returning again to the request state 502, if the request or transaction is a read, then the LRSI device 66 transitions to the read state 506 along path 618. The read is initiated upon the LRSI device 66 entering the read state 506. If, however, the local request asynchronous FIFO memory device 64 does not contain the data to be read, then the LRSI device 66 will stay in the read state 506 to await arrival of the data. The LRSI device 66 will stay in the read state 506 until the read is completed. At that point, the LRSI device 66 will transition to the idle state 500 along path 622. For a read, the request or transaction is complete when the empty signal placed on the output line 79 by the local request asynchronous FIFO memory device 64, is de-asserted. In response to the de-assertion of the output line 79, the LRSI device 66 pops the data off the local request asynchronous FIFO memory device 64 and returns to the idle state 500.

Figure 9:
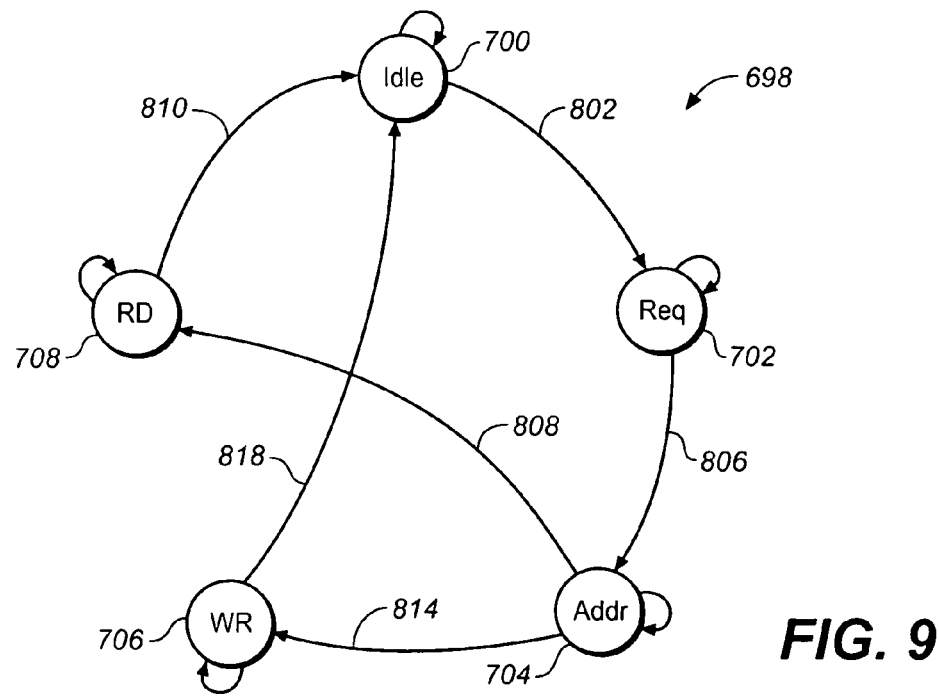
FIG. 9 is a state diagram for state machine forming part of a second local interface device of the local bus adapter of FIG. 4.

Referring now to FIG. 9, a state diagram 698 suitable for use in implementing the control logic residing within the LRDI device 62 of the LALS 60 will now be described in greater detail. As may now be seen, the state diagram 698 describes an implementation of the LRDI device 62 which has five states: an idle state 700, a request state 702, an address state 704, a write state 706 and a read state 708. Initially, the LRDI device 62 is in the idle state 700 awaiting a request or transaction from a global device, coupled to the global system bus 22, for access to a device coupled to the local system bus 32. The LRDI device 62 will stay in the idle state 700 until it receives a request requiring access to the local system bus 32 from a global device that has control of or access to the global system bus 22. Upon receiving such a request, the LRDI device 62 will transition to the request state 702 along path 802. The LRDI device 62 will then wait in the request state 702 for the local arbiter 34 to grant access to the local system bus 32.

While the LRDI device 62 is in the request state 702, the GRDI device 52 will continue to retry new transaction requests originating from a local device to force the release of the current local system bus ownership. Once the local arbiter 34 grants the global device access to the local system bus 32, the LRDI device 62 transitions to the address state 704 along path 806. From the address state 704, the LRDI device 62 will transition to the write state 706 via path 814 if the target device on the local system bus 32 is ready to accept or process the request or transaction and the request or transaction is a write. Conversely, the LRDI device 62 will transition to the read state 708 via path 808 if the target device on the local system bus 32 is ready to accept or process the request or transaction and the request or transaction is a write.

If the LRDI device 62 is to perform a read, the read data and the response are pushed into the local request asynchronous FIFO memory device 64 while the request is popped off the local request queue before the LRDI device 62 transitions from the read state 708 to the idle state 700 along path 810. If the targeted local device is not ready to handle the transaction, then the system remains at the read state 708 until the targeted local device is ready. The LRDI device 62 will then proceed with the read in the manner previously described.

If the targeted local device is ready to accept the write data when the LRDI device 62 enters the write state 706, both the request and the write data are popped off the queue for the local request asynchronous FIFO memory device 64 and the LRDI device 62 transitions from the write state 706 to the idle state 700 along path 818. If, however, the targeted local device is not ready to accept the write date when the LRDI device 62 enters the write state 706, the LRDI device 706 will transition to the idle state 700 and begin retrying the write in the manner previously set forth.

In accordance with the teachings set forth herein, it is possible for the data that forms part of a request or transaction to be partially written into a FIFO memory device, for example, the global request asynchronous FIFO memory device 54 or the local request asynchronous FIFO memory device 64, when the FIFO memory device is partially full. Thus, it is contemplated that, in one cycle a portion of the data may be written into the available locations of the FIFO memory device and the remainder of the data that form part of the transaction can be written into the FIFO memory device when the FIFO memory device has available space.

The particular embodiments disclosed herein are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A computer system, said computer system comprising:
a global bus;
at least one system device coupled to said global bus;
a local bus;
at least one local device coupled to said local bus; and
an asynchronous system bus adapter, said asynchronous system bus adapter coupled between said global bus and said local bus; wherein
said asynchronous system bus adapter further comprises:
a local bus adapter coupled between said global bus and said local bus, said local bus adapter handling transactions, initiated by one of said at least one system device, that require access to one of said at least one local device; and
a global bus adapter coupled between said local bus and said global bus, said global bus adapter handling transactions, initiated by one of said at least one local device, that require access to one of said at least one system device, wherein said local bus adapter is coupled to said global bus adapter, said local bus adapter issuing a signal, to said global bus adapter, which prevents said global bus adapter from handling transactions, initiated by one of said at least one local device, that require access to one of said at least one system device while transactions, initiated by one of said at least one system device, that require access to one of said at least one local device are on-going.

2. The system of claim 1, wherein said asynchronous system bus adapter further comprises a local transaction bus monitor, said local transaction bus monitor preventing transactions, initiated by a first one of said at least one local device, that requires access to a second one of said at least one local device, from going onto said global bus.

3. The system of claim 2, wherein said local bus adapter is coupled to said global bus adapter, said local bus adapter issuing a signal, to said global bus adapter, which prevents said global bus adapter from handling transactions, initiated by one of said at least one local device, that require access to one of said at least one system device, that require access to one of said at least one local device are on-going.

4. The system of claim 1, wherein said local bus adapter further comprises:
a memory device;
a first local interface coupled between said global bus and said memory device, said first local interface device including a state machine for controlling the transfer, from said global bus to said memory device, of information related to transactions, initiated by said at least one system device, that require access to one of said at least one local device; and
a second local interface device coupled between said memory device and said local bus, said second local interface device including a state machine for controlling the transfer, from said memory device to said local bus, of information related to transactions, initiated by said at least one system device, that require access to one of said at least one local device.

5. The system of claim 4, wherein said memory device is a first-in-first-out (FIFO) memory device.

6. The system of claim 4, wherein said first local interface device is coupled to said global bus adapter, said first local interface device issuing a signal, to said global bus adapter, which prevents said global bus adapter from handling transactions, initiated by one of said at least one local device, that require access to one of said at least one system device while transfers, from said global bus to said memory device, of information related to transactions, initiated by one of said at least one system device, that require access to one of said at least one local device are on-going.

7. The system of claim 4, wherein said second local interface device is coupled to said global bus adapter, said second local interface device issuing a signal, to said global bus adapter, which prevents said global bus adapter from handling transactions, initiated by one of said at least one local device, that require access to one of said at least one system device while transfers, from said memory device to one of said at least one local device, of information related to transactions, initiated by one of said at least one system device, that require access to one of said at least one local device are on-going.

8. The system of claim 7, wherein said first local interface device is coupled to said global bus adapter, said first local interface device issuing a signal, to said global bus adapter, which prevents said global bus adapter from handling transactions, initiated by one of said at least one local device, that require access to one of said at least one system device while transfers, from said global bus to said memory device, of information related to transactions, initiated by one of said at least one system device, that require access to one of said at least one local device are on-going.

9. The system of claim 8, wherein said asynchronous system bus adapter further comprises a local transaction bus monitor, said local transaction bus monitor preventing transactions, initiated by a first one of said at least one local device, that require access to a second one of said at least one local device, from going onto said global bus.

10. The system of claim 1, wherein said global bus adapter further comprises:
a memory device;
a first global interface device coupled between said local bus and said memory device, said first global interface device including a state machine for controlling the transfer, from said local bus to said memory device, of information related to transactions, initiated by said at least one local device, that require access to said at least one system device; and
a second global interface device coupled between said memory device and said global bus, said second global interface device including a state machine for controlling the transfer, from said memory device to said global bus, of information related to transactions, initiated by said at least one local device, that require access to said at least one system device.

11. The system of claim 10, wherein said memory device is a first-in-first-out (FIFO) memory device.

12. The system of claim 10, wherein said local bus adapter further comprises:
a memory device;
a first local interface coupled between said global bus and said memory device, said first local interface device including a state machine for controlling the transfer, from said global bus to said memory device, of information related to transactions, initiated by one of said at least one system device, that require access to one of said at least one local device; and
a second local interface device coupled between said memory device and said local bus, said second local interface device including a state machine for controlling the transfer, from said memory device to said local bus, of information related to transactions, initiated by one of said at least one system device, that require access to one of said at least one local device.

13. The system of claim 12, wherein said memory device of said global bus adapter is a first first-in-first-out (FIFO) memory device and said memory device of said local bus adapter is a second FIFO memory device.

14. The system of claim 12, wherein said first local interface device is coupled to said second global interface device, said first local interface issuing a signal, to said second global bus interface device, which prevents said second global bus interface device from transferring, from said memory device of said global bus adapter to said global bus, information related to transactions, initiated by one of said at least one local device that require access to one of said at least one system device while transfers, from said global bus to said memory device of said local bus adapter, of information related to transactions, initiated by one of said at least one system device, that require access to one of said at least one local device are on-going.

15. The system of claim 12 wherein said second local interface device is coupled to said first global bus interface device, said second local interface device issuing a signal, to said first global bus interface device, which prevents said first global interface device from transferring, from said local bus to said memory device of said global bus adapter, information related to transactions, initiated by one of said at least one local device, that require access to one of said at least one system device while transfers, from said memory device of said local bus adapter to said local bus, of information related to transactions, initiated by one of said at least one system device, that require access to one of said at least one local device are on-going.

16. The system of claim 15, wherein said first local interface device is coupled to said second global interface device, said first local interface device issuing a signal, to said second global bus interface device, which prevents said second global bus interface device from transferring, from said memory device of said global bus adapter to said global bus, information related to transactions, initiated by one of said at least one local device, that require access to said at least one system device while transfers, from said global bus to said memory device of said local bus adapter, of information related to transactions, initiated by one of said at least one system device, that require access to one of said at least one local device are on-going.

17. The system of claim 16, wherein said asynchronous system bus adapter further comprises a local transaction bus monitor, said local transaction bus monitor preventing transactions, initiated by a first one of said at least one local device, that require access to a second one of said at least one local device, from going onto said global bus.

18. A multi-digital signal processor (DSP) computer system, comprising:
a global bus;
a first local bus coupled to said global bus;
a first local bus adapter coupled between said global bus and said first local bus;
a first global bus adapter coupled between said first local bus and said global bus;
a first DSP core coupled to said first local bus;
at least one local device coupled to said first local bus;
a second local bus coupled to said global bus;
a second local bus adapter coupled between said global bus and said second local bus;
a second global bus adapter coupled between said second local bus and said global bus;
a second DSP core coupled to said second local bus; and
at least one local device coupled to said second local bus;
said first global bus adapter and said second local bus adapter handling transactions, initiated by said first DSP core, that require access to one of said at least one local device coupled to said second local bus; and
said second global bus adapter and said first local bus adapter handling transactions, initiated by said second DSP core, that require access to one of said at least one local device coupled to said first local bus.

19. The system of claim 18, wherein:
said first local bus adapter is coupled to said first global bus adapter, said first local bus adapter issuing a signal, to said first global bus adapter, which prevents said first global bus adapter from handling transactions, initiated by said first DSP core, that require access to one of said at least one device coupled to said second local bus while transactions, initiated by said second DSP core, that require access to one of said at least one local device coupled to said first local bus are on-going; and
said second local bus adapter is coupled to said second global bus adapter, said second local bus adapter issuing a signal, to said second global bus adapter, which prevents said second global bus adapter from handing transactions, initiated by said second DSP core, that require access to one of said at least one device coupled to said first local bus while transactions, initiated by said first DSP core, that require access to one of said at least one local device coupled to said second local bus are on-going.

20. The system of claim 18, wherein:
said first local bus adapter further comprises:
a memory device;
a first local interface device coupled between said global bus and said memory device, said first local interface device including a state machine for controlling the transfer, from said global bus to said memory device, of information related to transactions, initiated by said second DSP core, that require access to one of said at least one local device coupled to said first local bus; and
a second local interface device coupled between said memory device and said first local bus, said second local interface device including a state machine for controlling the transfer, from said memory device to said first local bus, of information related to transactions, initiated by said second DSP core, that require access to one of said at least one local device coupled to said first local bus;

said first global bus adapter further comprises:
a memory device;
a first global interface device coupled between said first local bus and said memory device, said first global interface device including a state machine for controlling the transfer, from said first local bus to said memory device, of information related to transactions, initiated by said first DSP core, that require access to one of said at least one local device coupled to second local bus; and
a second global interface device coupled between said memory device and said global interface device including a state machine for controlling the transfer, from said memory device to said global bus, of information related to transactions, initiated by said first DSP core, that require access to one of said at least one local device coupled to said second local bus;
said second local bus adapter further comprises:
a memory device;
a first local interface device coupled between said global bus and said memory device, said first local interface device including a state machine for controlling the transfer, from said global bus to said memory device, of information related to transactions, initiated by said first DSP core, that require access to one of said at least one local device coupled to said second local bus; and
a second local interface device coupled between said memory device and said second local bus, said second local interface device including a state machine for controlling the transfer, from said memory device to said second local bus, of information related to transactions, initiated by said first DSP core, that require access to one of said at least one local device coupled to said second local bus; and
said second global bus adapter further comprises:
a memory device;
a first global interface device coupled between said second local bus and said memory device, said first global interface device including a state machine for controlling the transfer from said second local bus to said memory device, of information related to transactions, initiated by said second DSP core, that require access to one of said at least one local device coupled to first local bus; and
a second global bus, said second global interface device including a state machine for controlling the transfer, from said memory device to said global bus, of information related to transactions, initiated by said second DSP core, that require access to one of said at least one local device coupled to said local bus.

21. The system of claim 20, wherein:
said first local interface device of said first local bus adapter is coupled to said second global interface device of said first global bus adapter, said first local interface device of said first local bus adapter issuing a signal, to said second global bus interface device of said first global bus adapter which prevents said second global bus interface device of said first global bus adapter from transferring, from said memory device of said first global bus adapter to said global bus, information related to transactions, initiated by said first DSP core, that require access to one of said at least one local device of said second local bus while transfers, from said global bus to said memory device of said first local bus adapter, of information related to transactions, initiated by said second DSP core, that require access to one of said at least one local device coupled to said first local bus are on-going;
said second local interface device of said first local bus adapter is coupled to said first global interface device of said first global bus adapter, said second local interface device of said fist local bus adapter issuing a signal, to said first global bus interface device of said first global bus adapter, which prevents said first global interface device of said first global bus adapter from transferring, from said first local bus to said memory device, of said first global bus adapter, information related to transactions, initiated by said first global bus adapter, information related to transactions, initiated by said first DSP core, that require access to one of said at least one local device coupled to said second local bus white transfers, from said memory device of said first local bus adapter to said first local bus, of information related to transactions, initiated by said second DSP core, that require access to one of said at least one local device coupled to said first local bus are on-going;
said first local interface device of said second local bus adapter is coupled to said second global interface device of said second global bus adapter, said first local interface device of said second local bus adapter issuing a signal, to said second global bus interface device of said second global bus adapter which prevents said second global bus interface device of said second global bus adapter from transferring, from said memory device of said second global bus adapter to said global bus, information related to transactions, initiated by second DSP core, that require access to one of said at least one local device of said first local bus while transfers, from said global bus to said memory device of said second local bus adapter, of information related to transactions, initiated by said first DSP core, that require access to one of said at least one local device coupled to said second local bus are on-going;
and said second local interface device of said second local bus adapter is coupled to said first global interface device of said second global bus adapter, said second local interface device of said second local bus adapter issuing a signal, to said first global bus adapter, which prevents said first global interface device of said second global bus adapter from transferring, from said second local bus to said memory device of said second global bus adapter, information related to transactions, initiated by said second DSP core, that require access to one of said at least one local device coupled to said first local bus while transfers, from said memory device of said second local bus adapter to said second local bus, of information related to transactions, initiated by said first DSP core, that require access to one of said at least one local device coupled to said second local bus are on- going.

* * * * *